(12) United States Patent
Marlowe (10) Patent No.: US 6,743,365 B1
(45) Date of Patent: Jun. 1, 2004

(54) MAGNETIC FILTRATION SYSTEM

(76) Inventor: John Marlowe, 3 Dominic Road, Childwall, Liverpool (GB), L16 1JY ( * ) Notice: Subject to any disclaimer, the term of this patent is extended or adjusted under 35 U.S.C. 154(b) by 0 days.

(21) Appl. No.: 09/674,041

(22) PCT Filed: May 10, 1999

(86) PCT No.: PCT/GB99/01462
§ 371 (c)(1),
(2), (4) Date: Oct. 24, 2000

(87) PCT Pub. No.: WO99/58247
PCT Pub. Date: Nov. 18, 1999

(30) Foreign Application Priority Data

May 8, 1998 (GB) .............................................. 9809902

(51) Int. Cl.[7] .......................... B01D 35/06; B03C 1/033; B03C 1/034
(52) U.S. Cl. .......................... 210/695; 210/745; 210/85; 210/143; 210/222; 210/223; 210/259; 210/322; 209/223.1; 209/232
(58) Field of Search .......................... 210/85, 86, 143, 210/222, 223, 335, 489, 695, 259, 322, 746; 209/223.2, 232, 223.1

(56) References Cited

U.S. PATENT DOCUMENTS

| | | | | |
|---|---|---|---|---|
| 2,149,764 A | * | 3/1939 | Frei .............................. | 210/223 |
| 4,784,762 A | * | 11/1988 | Taliaferro ..................... | 210/222 |
| 5,089,128 A | * | 2/1992 | Garaschenko et al. ...... | 210/222 |
| 5,389,252 A | | 2/1995 | Morrick ........................ | 210/223 |

FOREIGN PATENT DOCUMENTS

| | | | |
|---|---|---|---|
| DE | 90 01 431 | | 5/1990 |
| EP | 0 374 251 | | 6/1990 |
| FR | 1.114135 | | 4/1956 |
| GB | 684052 | | 12/1952 |
| WO | WO 97/04873 | * | 2/1997 |

* cited by examiner

Primary Examiner—David A. Reifsnyder
(74) Attorney, Agent, or Firm—Smith, Gambrell & Russell (57) ABSTRACT

A magnetic filtration system includes one or a plurality of collection units (1) comprising a magnet (4) disposed between a pair of plates (2, 3), one plate being magnetized North, the other, South. The plates are provided with facing apertures and facing pole pieces so that particles entering the recesses are both repelled from the apertures and attracted towards and retained in collecting regions between exposed facing plate portions.

36 Claims, 9 Drawing Sheets

MAGNETIC FILTRATION SYSTEM

DESCRIPTION

The present invention relates to a magnetic filtration system for filtering ferrous and some non-ferrous material from a fluid in which said material is in suspension.

The magnetic filter device of a previous application (9515352.4) (WO97/04873) (MARLOWE) comprises an annular magnet disposed between a pair of annular metal plates. Fluid flows into the device through recesses in the metal plates, and returns through the centre of the device when used in conjunction with a conventional filter.

Another device (FREI) (U.S. Pat. No. 2,149,764) uses a series of cylindrical magnets separated by a series of metal baffle plates, which are magnetised through contact with the magnets. The flux fields generated are designed to collect particles on the plates themselves and also around the edges of the perforations in the plates. A metal screen abuts the edges of the plates and is therefore magnetised through contact with it. The screen forms an envelope around the arrangement and is designed to increase the magnetised area in the actual flow path. Disadvantageously, however, the metal particles, which build up on the screen, form an ever-increasing obstruction to flow. In addition, any particles collected on the plates are exposed to the flow, and are in danger of being washed off. In the present invention, the magnetic flux direction and properties are used to advantage as described later herein.

A magnetic filtration system for filtering ferrous and some non-ferrous material from fluid, in which said material is in suspension, comprises inlet and outlet means. The system can advantageously be inserted at almost any point in a fluid system. The filtration system comprises one or a plurality of collection units that can be disposed in a housing. Magnetisable material, in particular ferrous particles and some non-ferrous particles drawn along with the ferrous particles can be collected in the collection units. Particles are advantageously magnetically held out of the flow path, and therefore do not result in obstruction of flow. The collection units can be readily removed from the housing, to be dismantled, cleaned of any material collected and re-installed for re-use in the system. In an embodiment where the magnet is an electromagnet, when the electromagnet is active, material can be collected from the fluid, and when the electromagnet is deactivated, the material collected can be removed from the units and disposed from the system.

The present invention is applicable to fluid systems that are subject to high flow rate and pressure.

In accordance with one aspect of the present invention, there is provided a magnetic filtration system for filtering magnetisable material from a fluid in which said material is in suspension comprising inlet means and outlet means, in which one or a plurality of collection units is disposed, each collection unit comprising one or a plurality of plates or plate arrays disposed either side of one or a plurality of magnets so that the plates or plate arrays have opposing polarities, wherein portions of the plates or plate arrays extend beyond part or all of an edge or edges of one or a plurality of said magnets, facing plates have one or a plurality of apertures, and wherein facing apertures define a region of magnetic repulsion, and facing plate portions define therebetween, a region of magnetic attraction and magnetisable material collection, such that the magnetic flux fields thus created facilitate preferential collection of magnetisable materials in the collection region between facing portions rather than in the region between said facing apertures.

It is an advantage that the facing collecting regions alternate with facing apertures such that the attractive flux fields generated in the collection regions and the repulsive fields disposed either side thereof facilitate collection in a volume sandwiched between exposed facing plate portions. Particles can thus be retained in three-dimensional space rather than on merely the magnetised surface area that is exposed to fluid flow. Each collection unit thus offers greater capacity for debris than that possible with the exposed surface area of its component parts when disassembled. The repulsive forces in the apertures of each collection unit divert magnetisable material from the apertures so that they collect preferentially between facing plate portions rather than in the apertures, to thus allow fluid to continue to flow through the unit even at capacity.

Advantageously, the respective plates of adjacent collection units having like polarity are disposed adjacent to one another so as to substantially restrict the collection of magnetisable particles to the collection regions substantially within the interior of the collection units. An individual collection unit will have its own distribution of magnetic flux, part of which are regions of magnetic attraction between the facing plate portions of the unit. If another unit is disposed so that the respective neighbouring plates have unlike polarity, one North, the other, South, the flux existent within the collection unit (as an individual) will be dispersed through the generation of further magnetic fields of attraction between adjacent collection units. If the collection unit is disposed beside another so that like poles of adjacent plates are facing, then the repulsive forces thus created between adjacent collection units will condense the attractive magnetic flux towards the region between facing plate portions, more so than when there are no further adjacent units.

Advantageously, there is provided a housing made of a non-magnetisable material. This limits magnetisable material collection to the collecting regions within the collection units if the collection units are disposed in close proximity to the interior of said housing. The housing can be made of a magnetisable material if said collection units still facilitate fluid passage therethrough even when filled with contaminant.

It is an advantage that there is provided a housing integral to a fluid flow system, said filtration system still permitting fluid flow the through even at capacity.

In one embodiment, each collection unit can be further separated from an adjacent collection unit by a spacing member. This allows for the better utilisation of the available magnetic flux density.

It is an advantage that the spacing member is non-magnetic. It is also an advantage in certain instances that the spacing member is magnetic. The magnetisation or non-magnetisation of the spacing member is discussed later.

It is an advantage that the apertures in respective collection units, which are in closer proximity to the inlet means, are larger than those of units disposed nearer the outlet means. This provides collection units of varying magnetic strength along the direction of flow and alleviates any collection bias on the collection units closest to the inlet.

It is preferred that alignment means is provided for disposing the apertures and plate portions in facing plates of a collection unit in substantial axial alignment. As fluid flows more smoothly through apertures that are aligned, regions of particle collection surrounding the apertures are thus exposed to a minimum of fluid turbulence, thus aiding in the retention of material collected. The presence of an aperture on a plate creates adjacent plate regions of like polarity, which thus generate between them, an axial region of magnetic repulsion. By aligning a pair of apertures of facing plates, the region of magnetic repulsion extends through an axial length of the collection unit. As the apertures are also the means for fluid flow through the collection unit, the path of fluid flow is also the region from which magnetisable particles, suspended in the fluid, will be repelled. As the repulsive force acts radially, particles will tend to be redirected from the fluid flow path and repelled towards the adjacent region between the plate portions either side of the axial region of repulsion. The plate portions have between them, an attractive magnetic force acting substantially orthogonally to that of the repulsive flux field. Particles entering the axial recess between facing apertures are thus both repelled from the axial recess and attracted towards the attractive flux field of the gap or collecting region. Furthermore, as each collecting region has apertures either side of it, the attractive flux lines in the collecting region are further condensed by the repulsive flux lines extending orthogonally on either side. Condensing the flux lines increases the magnetic field strength in that region. It is the combined actions of these two fields that enables the apertures to be kept free of magnetisable particles and that enables particles to be held in the collecting region despite high fluid flow (for example 400 liters/minute) and fluid pressure (for example 7000 psi).

It is an advantage that further alignment means is provided for disposing the apertures of respective collection units in substantial axial alignment. This too will minimise the fluid turbulence between collection units, to any particles held magnetically in respective collection units.

Advantageously, said alignment means and further alignment means comprise a tab of given dimension on an internal edge of the plate and an axial unit having a groove of corresponding dimension to that of the tab, into which groove said tab can locate to provide a chosen axial and radial alignment of the facing plate portions and apertures of a collection unit and/or those of an assembly of collection units.

Preferably, the magnetic filtration system is further provided with flow directing means for directing fluid flow from the inlet means towards the apertures in said plates. The internal surface of the housing of the filtration system can be contoured into a conical shape and the upper portion of the axial unit provided with a conical portion so that fluid from said inlet means is radially dispersed towards the apertures in the more or most proximal collection unit. Alternatively, a unit separate from the housing and the axial unit may be included between the inlet means and the first collection unit, with an annular conical channel for directing fluid flow in the same manner.

Preferably, further slot-like apertures are provided in facing apertures and facing plate portions to further enhance the magnetic flux density between the facing plates of each collection unit. The provision of slot-like apertures, which are aligned in facing plate portions, creates regions of magnetic repulsion, which are closer together than those of the first-mentioned apertures. The closer like poles are disposed to one another, the more intense the forces of magnetic repulsion between them will be. The inclusion of such regions, for instance, in the middle of a collecting region further focuses the attractive flux fields in these regions. The repulsive magnetic forces acting radially further condense the flux density of the attractive flux lines, between facing plate portions, acting axially.

Advantageously, facing pole piece pairs are curved towards one another to further enhance the magnetic flux fields therebetween. As one pole piece is magnetised North and the other, South, the closer they are disposed to one another, the stronger the flux between them will be, up until a point where the plates are saturated with magnetic flux from the magnet. In addition, as flux is dispersed through the edges of the plates, curving the edges of facing pole pieces towards each other redirects the flux to an axial region between the plates. If the plates are left uncurved, the flux fields will extend radially from the edge of the plate. A field of attraction will still be generated between facing pole pieces, but of lesser strength than where they are curved towards one another, where the flux fields emerging from facing pole pieces are substantially directed towards one another.

Advantageously, facing plates/plate arrays are separated by a distance which best utilises the magnetic flux emergent from the edges of said facing plates to attract and retain magnetisable material in the fluid and which also provides the collection capacity required. The larger the collection capacity of the unit, the less frequently it will need cleaning. Thus the separation of the plates can be varied to determine the required capacity for material as well as the magnetic flux intensity distributions in the collecting regions and in the apertures. The plates are brought together in close enough proximity to enable axial collection, in the collecting region between the internal portions of each plate pair, of magnetisable particles, as small as one micron in size, despite high fluid flow (for example 400 liters/minute) and high pressure (for example, up to 7000 psi).

Advantageously, that the attractive flux lines between facing plate portions are substantially orthogonal to the repulsive flux lines in the apertures, such that magnetisable material entering the apertures, is subject to the influence of both attractive and repulsive flux fields.

Advantageously, internal surfaces of the housing are disposed in close proximity to the outer portions of the plate/plate array pairs in order to substantially constrain fluid flow in the filtration system to regions in which magnetic flux fields generated by plate/plate array pairs facilitate the attraction and retention of the size range and type or types of non-magnetisable particle input to the filtration system, for example, ferrous particles smaller than one micron.

Alternatively, where the housing is substantially larger than the diameter of the plates, the clearance between the collection units and the housing may encompass regions beyond the efficient magnetic range of the collecting region. In such an instance, it is preferable to include one or a plurality of distribution plates having further apertures in substantial axial alignment with said plate apertures, which can be disposed either side of one or more of the collection units to ensure that all fluid is exposed to regions having magnetic flux density, similar to, or greater than a threshold required for particle attraction. The different sizes of particle and the type of particle in suspension in the fluid will have different such thresholds. These threshold intensities also depend on the size and type of other material in suspension as well as fluid flow and pressure. For instance, the threshold intensity required to attract a particle which of a given size, for example 1 micron, will rise if other forces acting on the particle are increased, as when fluid pressure is increased or if fluid flow is increased.

Preferably, the housing comprises one or a plurality of sealable sections with interlockable threaded portions that enable said sections to be readily assembled or dismantled. The sections of the housing screw apart to facilitate insertion or removal of the collection unit assembly into or from the housing, and screw together to encase the assembly. When required, the assembly can be removed from the housing, cleaned of any magnetisable material debris present and replaced inside for re-use.

Preferably, the housing is further provided with means for attachment to a fluid system.

Advantageously, isolation means may be provided for isolating (blanking off) fluid flow to and from the filtration system to facilitate its removal from and insertion into the fluid system.

Advantageously, monitoring means for monitoring the presence and/or amount of material collected is disposed in the filtration system, so that particle collection and therefore wear can be assessed without dismantling the system.

It is preferred that close down means is provided for enabling a system, of which said filtration system is a part, to be closed down if a pre-determined level of debris collected is reached. If the wear of a component can be assessed at an early stage, other components sharing the same fluid will be less likely to wear and complete system failure, perhaps involving substantially accelerated wear of several components and/or mechanical seizure, is thus less likely.

Advantageously, conventional filter media is disposed in the housing to remove non-magnetisable particles input to the system.

Advantageously, the magnet or magnets in the collection unit(s) is/are electromagnet(s) having switch means for activating the electromagnet(s) to collect particles and for de-activating the electromagnet(s) to facilitate release of any particles collected. This will facilitate more convenient removal of any material accrued in the collection unit before its re-use. The switch means, disposed outside the housing for manual access, is used to activate or de-activate the electromagnet depending on whether the collection unit is in a filtration mode or in a cleaning mode. Alternatively, the switch means can be disposed inside the housing if external remote means of its operation are provided.

A further advantage of the present invention resides in the fact that the magnetic elements can impart some magnetism to the fluid flowing therethrough and this can be used in a manner well known to those skilled in the art and therefore not described in more detail herein.

It is preferred that conventional cellulose fibre, metal or other filter material is disposed in the magnetic filtration system to remove non-magnetisable material input to said system. Advantageously, the filter material is placed downstream of one or a plurality of collection units.

In accordance with a further aspect of the present invention a method of operating a system for the removal of magnetisable particles from a fluid system in which said particles are in suspension, includes providing an apparatus comprising inlet means and outlet means, in which one or a plurality of collection units is disposed, each collection unit comprising one or a plurality of plates or plate arrays disposed either side of one or a plurality of magnets so that the plates or plate arrays have opposing polarities, wherein portions of the plates or plate arrays extend beyond part or all of an edge or edges of one or a plurality of said magnets, facing plates have one or a plurality of apertures, and wherein facing apertures define a region of magnetic repulsion, and facing plate portions define therebetween, a region of magnetic attraction and magnetisable material collection, passing fluid through said apertures, retaining said particles in said regions of magnetic attraction and repelling particles from said apertures.

Advantageously, said method of operating the system includes the steps of detaching the plates from the magnets and then wiping off debris from the plates and the magnet, or alternatively, blowing the debris off the undismantled collection unit assembly with an air line. Particles are easier to blow off if the air line is directed across the flux lines of attraction rather than parallel to them.

In accordance with a still further aspect of the present invention, a method of operating a system for the removal of magnetisable particles from a fluid system in which said particles are in suspension, includes the steps of providing an apparatus comprising inlet means and outlet means, in which one or a plurality of collection units is disposed, each collection unit comprising one or a plurality of plates or plate arrays disposed either side of one or a plurality of electromagnets so that the plates or plate arrays have opposing polarities, wherein portions of the plates or plate arrays extend beyond part or all of an edge or edges of one or a plurality of said magnets, facing plates have one or a plurality of apertures in axial alignment, and wherein facing apertures define a region of magnetic repulsion, and facing plate portions define therebetween, a region of magnetic attraction and magnetisable material collection, passing fluid through said apertures, activating the electromagnet to retain said particles in said regions of magnetic attraction and repel particles from said apertures, de-activating the electromagnet to release the particles from said regions of magnetic attraction and disposing of said particles from said fluid system.

Advantageously, the method for activating and de-activating the electromagnet includes passing current through coils of the electromagnet.

Advantageously, monitoring the quantity and/or type of debris collected includes the steps of providing detection means for detecting the presence of particles collected between facing plate portions, part of which detection means extends in the collecting region of one or more collection units, monitoring the type or quantity of material present, providing alarm means, setting off the alarm if material quantity rises beyond a pre-determined rate or amount, providing closing down means for the fluid system and closing down the fluid system if the quantity of material rises beyond a further pre-determined rate or amount.

Specific embodiments of the present invention will now be described with reference to the accompanying drawings in which:

FIGS. 1 to 9 show both internal plan view and cross-section of different embodiments of collection unit, which can form part of a magnetic filtration system;

FIG. 3 is a perspective view of part of a further embodiment of a collection unit;

FIG. 9 is an internal plan view of a final collection unit having bar magnets and collection areas at the edges of the plates;

The arrows in FIGS. 10, 13 and 15 denote the direction of fluid flow.

Figure 1A:
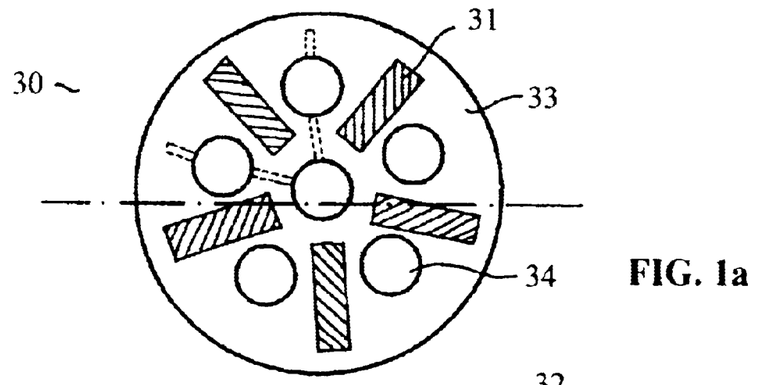
FIGS. 1a and 1b are plan and side views of a collection unit according to the present invention and having radially extending bar magnets.
Figure 1B:
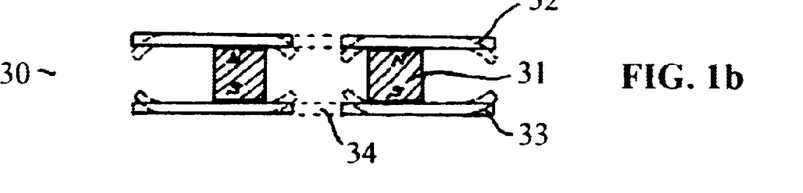
Figure 2A:
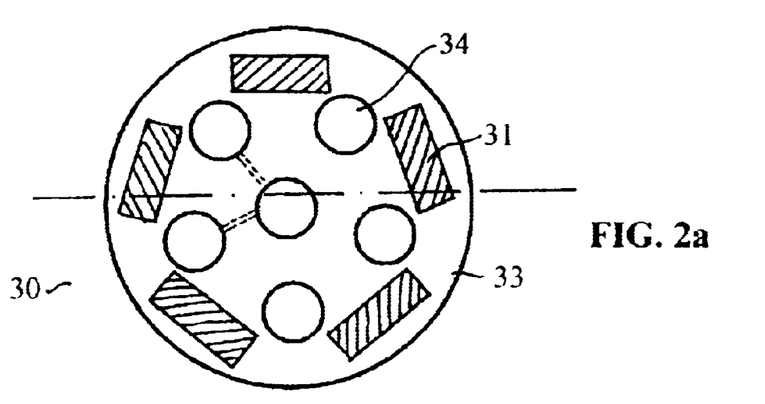
FIGS. 2a and 2b are plan and side views of a collection unit according to another aspect of the present invention and having circumferentially arranged bar magnets.
Figure 2B:
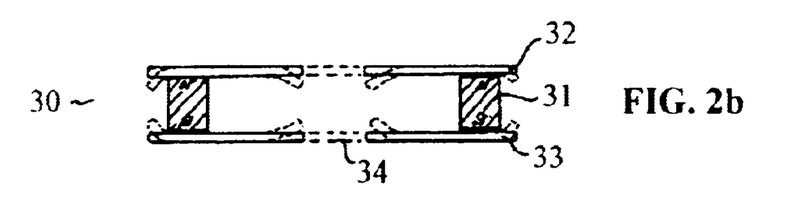

FIGS. 1 to 9 show various embodiments of collection units. In FIGS. 1a and 1b, a collection unit 30 has magnets 31 having faces of the same magnetic polarity in contact with a collection plate 32. Respective faces of the magnets, of opposite polarity, are in contact with a further collection plate 33. One plate is magnetised North, the other South Apertures 34 in the plates are passage means for fluid flow through the unit. In FIG. 1. the magnets 31 are arranged radially. FIGS. 2a and 2b have plates magnetised in a similar manner, but with the magnets arranged circumferentially. The dotted lines in FIGS. 1b and 2b show alternative profiles of plates. The dotted lines in FIGS. 1a and 2a show slot-like apertures that may be added to the plates. These arrangements generate three-dimensional collection regions between the plate pairs other than where the apertures are aligned, thus offering a relatively large capacity for contaminant. The distance between the plates, the number and size of apertures and the overall magnetic field strength can be varied to suit the required flow rate desired through the unit and the size and type of contaminant in the fluid. The smaller the aperture and the closer the plates, the greater the magnetic flux distributions around the collecting region. This then facilitates the ability of the unit to attract and retain very small magnetisable particles.

The number and size of the apertures in each plate will determine the overall cross-sectional area available to fluid flow. The size and number of apertures can thus be varied to correspond with the dimensions of an inlet or outlet of the fluid system. If the total cross-sectional area of the apertures is made smaller than that of the fluid system, there will be an increase in fluid velocity where fluid flow is more constricted. If the total cross-sectional area of the apertures is larger than that of the fluid system, there will be a reduction in fluid speed where fluid flow is dilated. If the fluid system can withstand the reduction in fluid speed across the filtration system, it may be an advantage to slow the flow to delay particles for a longer period of time, to thus enable them to be captured more easily. In addition, the aperture dimension should be larger than the largest particle likely to be suspended in the fluid, to prevent occlusion of the apertures.

Apertures having the same width, if aligned, will define between them an axial aperture of corresponding width. The narrower the axial aperture width, the greater the repulsive force inside it and therefore the greater the ability of the repulsive magnetic flux to redirect particles from the fluid flow path towards the collecting regions. However, a reduction in aperture dimension produces a corresponding reduction in the cross-sectional area available for flow unless there is a corresponding increase in the number of apertures. Aperture width is thus optimised for both required flow throughput and magnetic flux strength for the attraction and retention of particles, of a size range and type, present in the fluid system. When facing plate portions are aligned with one another, the greater the edge width, the wider the collecting region and therefore the greater the capacity for collection of material. However, the capacity for collection is moderated by the total axial recess volume required for fluid throughput. The repulsive effect from an axial recess is stronger at the edge of a region of magnetic attraction than it would be, for instance, in the middle of the collecting region. Thus, for a required collection capacity, it may be more advantageous to have narrower but more numerous plate portions so that the repulsive forces in the axial recesses are utilised to best effect.

Because of the chosen axis of polarisation of the magnet, magnetic flux from the magnet face in contact with the plate is then preferentially dispersed and concentrated towards the peripheral edges of the plates. The aperture dimension, the number of apertures and the thickness of the plate are all factors that determine the overall peripheral edge surface area available for magnetic flux dispersion. The peripheral surface area can thus be varied to utilise the available magnetic flux from the magnet attached thereto. The magnetic flux emerging from a surface is given by the equation:

$$\Phi_M = B_M \times A_M$$

where $B_M$ is magnetic flux density of the magnet material, $A_M$ is the cross-sectional area (in cm$^2$) of the magnet through which the flux acts and $\Phi_M$ is the magnetic flux through area $A_M$. The flux $\Phi_M$ will be dispersed through a peripheral surface area $A_P$ of the edges. The flux $\Phi_M$ divided by $A_P$ should not exceed the saturation flux density for the material of which the plate is made. For mild steel, this figure is around 15,000 Gauss.

The strength of the magnet in any of the embodiments is advantageously tailored to suit the optimum saturation characteristics of the peripheral surface area of the plates. Consideration should be given to the increase in magnetic flux generated when like poles of adjacent core units interact with each other. The introduction of spacing units (discussed later herein) isolates the magnetic flux densities created in each core unit and might be employed to alleviate the above problem.

For each design, there will be an optimum flux density for the available peripheral area of the plate. Consequently, either the peripheral area may be selected to match the flux density available from a given magnet, or the magnet strength may be selected to suit the available peripheral surface area. Whilst over-fluxing will not detract from the performance of the invention, it will be appreciated that best production costs can be achieved by adopting this approach. Exceeding the optimum magnetic flux possible for a given plate dimension means that flux lines extend through the outer radial face of the plate, thus enabling particles to be collected on the plate outside of the collection unit. Collection of particles is preferably inside the unit where they can be held onto more strongly.

Provision of a greater magnetic flux than required can enable the system to have magnetic flux in reserve. The ability to attract and retain particles can then be increased by increasing the peripheral edge area by, for instance, adding another plate or replacing the plate with that of a greater thickness. The addition of the aforementioned slot-like apertures in the plates increases the peripheral surface area further and can utilise any excess flux to enhance the retentive function of the collection unit.

By under-sizing the magnet strength, one fails to fully utilise the available peripheral area and hence, the retentive abilities of the collection units are not optimised.

Figure 3:
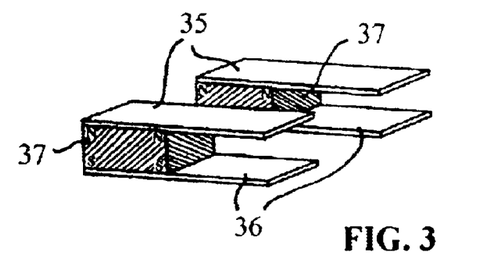

FIG. 3 shows a collection unit or part of a collection unit having pairs of collection plates 35, 36 of opposite magnetic polarity, through contact with magnets 37. Adjacent collection plates 35 thus have like polarity. This arrangement permits the use of non-circular magnets. Magnetisable material can be collected between plate pairs 36 and 37 and retention of particles therebetween is enhanced by the relative proximity and/or intensity of like fields from one or a plurality of adjacent plate pairs.

Figure 4A:
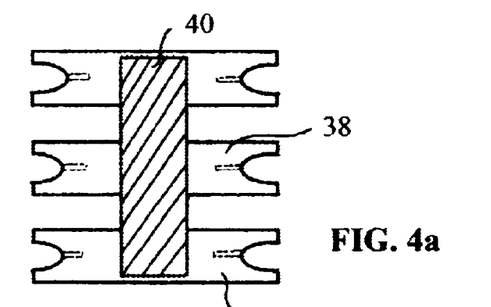
FIGS. 4a and 4b are internal and side views of a further embodiment of a collection unit.
Figure 4B:
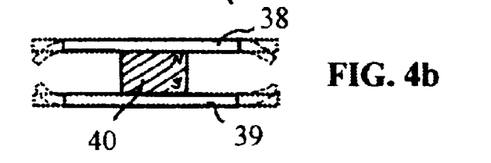
Figures 5A, 5B:
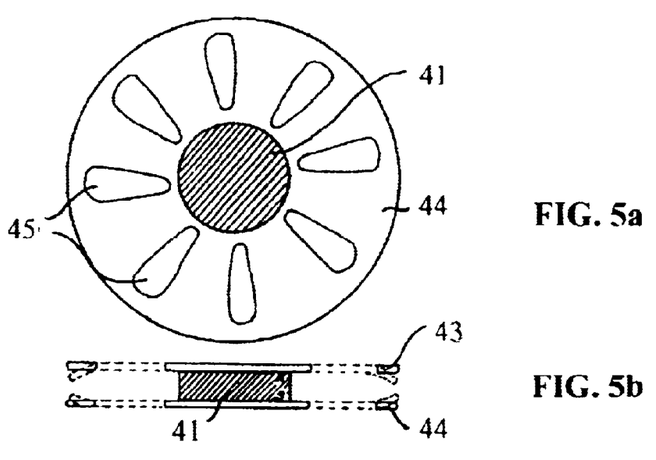
FIGS. 5a and 5b are plan and side views of a collection unit according to a still further aspect of the present invention and having radially extending apertures and a cylindrical magnet.

A collection unit in FIGS. 4a and 4b has plates having pole pairs 38, 39 magnetised through contact with a magnet 40 disposed therebetween. Through contact with the same magnet face, adjacent plates 38 have like polarity. Fluid flows in the apertures between adjacent plates as well as in the recesses in the plates. Magnetisable material in suspension in the fluid will be repelled from these apertures and recesses and attracted to collecting regions between the pole pairs. This arrangement allows the magnetisation of a plurality of isolated plates through contact with one magnet, and the creation of adjacent repulsion zones along the length of the magnet. The dotted lines on FIG. 4a show that further apertures can be added to the plates 38, 39 to enhance the ability of the collection unit to retain magnetisable particles.

Collection units in FIGS. 5a, 5b, 6a and 6b have cylindrical magnets 41, opposite faces of which magnetise plates 43, 44, North and South respectively. The unit illustrated in FIGS. 5a and 5b has radially extending apertures 45 larger at the perimeter of the plate than nearer the centre. Repulsive forces are greater where the aperture is narrower. A gradation in magnetic field strength is provided across the radial span of each aperture, and therefore induces a radial gradation in the size and/or type of particle collected between the plates.

Figure 6A:
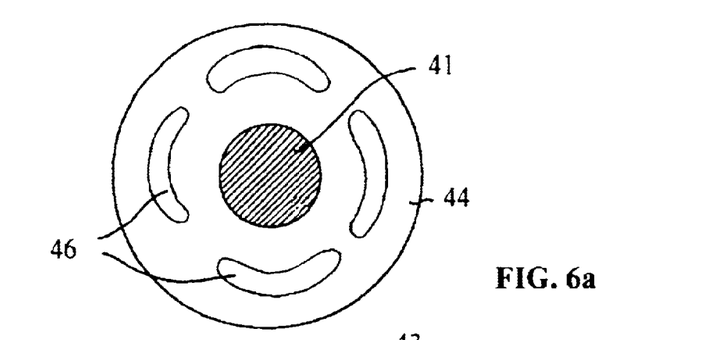
FIGS. 6a and 6b are plan and side views of a collection unit according to another aspect of the present invention and having circumferentially arranged slots and a cylindrical magnet.
Figure 6B:
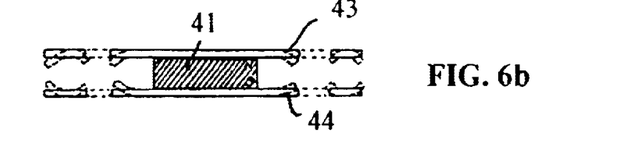

The collection unit in FIGS. 6a and 6b has circumferentially disposed and extending apertures 46. A gradation in magnetic field strength is provided across the circumferential span of each aperture, and therefore induces a circumferential gradation in the size and/or type of particle collected between the plates. Repulsive forces are stronger in regions surrounded by more edges.

Figure 7A:
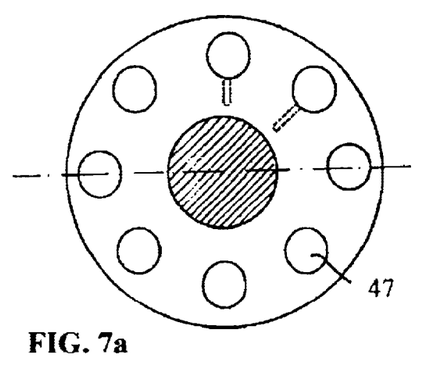
FIGS. 7a, 7b and 7c are plan and side views of an alternative arrangement of collection unit and illustrates other orientations and shapes of apertures.
Figure 7B:
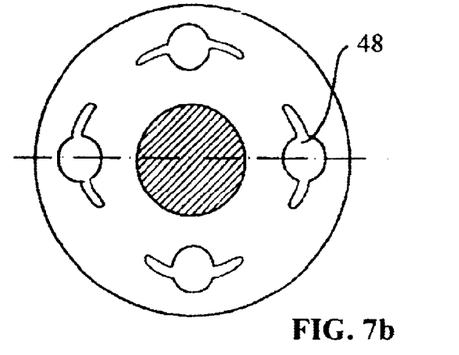
Figure 7C:
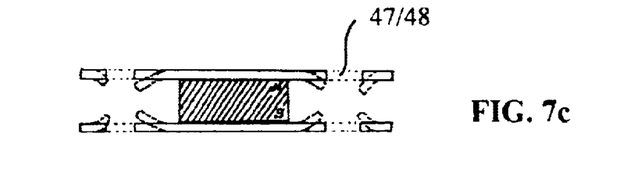

The collection units in FIGS. 7a, 7b and 7c illustrate other shapes of apertures 47, 48 for collection plates. The uniform aperture of FIG. 7a defines a region of uniform magnetic flux density across the cross-section of the aperture. In FIG. 7b, the narrower slot-like apertures in the plate define portions of the plate of like polarity disposed in relatively close proximity, and around which, the magnetic flux density is thus enhanced. The closer the spacing between like poles, the greater the repulsive effect between them, and therefore, material is less likely to accumulate in the passage means for fluid.

Figure 8A:
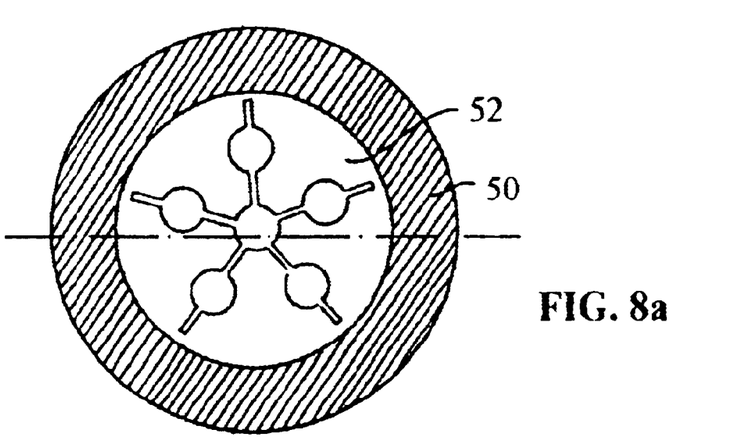
FIGS. 8a and 8b are plan and side views of a still further arrangement of collection unit having an annular magnet inside which the apertures are disposed
Figure 8B:
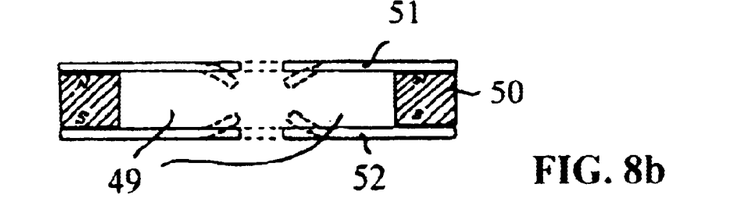

A collection unit in FIG. 8 has collecting regions 49 arranged inside the aperture of an annular magnet 50. Plates 51, 52 abut opposite faces of the magnet 50. Such an arrangement could facilitate the wiring of an electromagnet. For example, an electromagnet coil and its connections may be easier to isolate from fluid flow in this arrangement. In a further variation of this arrangement (not shown), a circular plate pair is centrally disposed either side of the magnet, having a large enough outer diameter to abut it, but a small enough inner diameter to expose part of the magnet. The exposed magnet faces could then additionally have disposed thereon, further plate portions, adjacent to the central plate pair or disposed substantially concentric to that of the central plate.

Figure 9:
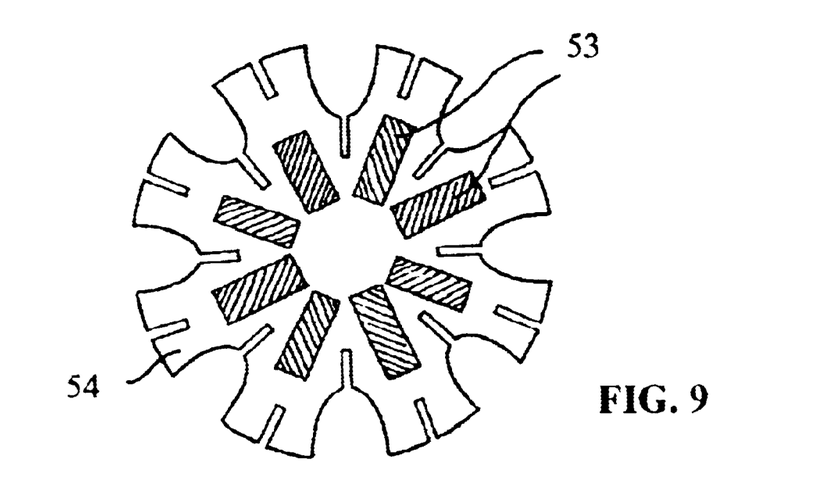

FIG. 9 shows a collection unit having a plurality of radially arranged magnets 53 with like poles in abutment with a collection plate 54, opposite poles in abutment with a facing collection plate (not shown). This arrangement facilitates the adjustment of the magnetic flux density of the collection unit through variation of the number of magnets present in the collection unit.

The plates/plate arrays shown in FIGS. 1 to 7 can be further provided with narrow longitudinal apertures extending radially or circumferentially. Examples of these are represented by dotted lines on FIGS. 1a, 2a and 4a. This will produce zones of enhanced magnetic repulsion. The perimeter portions of facing plate portions in any of the embodiments can also be curved towards one another to enhance the strength of the attractive magnetic flux between them. Examples of these are represented by dotted lines on FIGS. 1b, 2b, 4b, 5b, 6b, 7c, 8b, and shown in solid lines on FIGS. 10 to 13 and 15 to 17. One of the major advantages of the present invention resides in the provision of the recesses or apertures which allow the magnetic flux density to be concentrated in the collection region whilst also creating a region of magnetic repulsion within the recesses which prevents the build-up of magnetic particles therein, thereby avoiding blocking therein and obstruction of flow. This feature enables flow to be maintained within the filter even when the filter has reached contaminant capacity, this capacity being approximately the volume defined between exposed facing plate portions. As mentioned earlier, the capacity of the unit should optimally suit the degree of contamination of the fluid system, the size and type of particle that makes up this contamination and the system flow rate and pressure.

Referring to FIGS. 10 to 13, a collection unit 1 is formed from a plate array pair 2, 3 between which, one or a plurality of magnets 4 is disposed. The plates attach to the magnet by magnetic attraction. Each plate array comprises pole pieces 5 and recesses or apertures 6, which are further provided with slots 7. Facing pole pieces are curved towards one another to enhance the magnetic flux between them. One plate array is polarised North, the other South through contact with the magnet 4. The unit 1 is mountable onto a non-magnetisable rod 8. The diameter of the rod 8 is smaller than the internal diameter of central holes in the plates and the magnets. In this specific embodiment, a collection unit is assembled by placing a magnet between a pair of plates. In specific embodiments, for plates of diameter ranging between 30 to 50 mm and of thickness ranging from 1 to 3 mm, the plate separation can range from 5 to 10 mm. Other plate separations, thicknesses, and diameters can be used. Apertures and pole pieces are symmetrically arranged about the plate. If, for example, there are eight apertures, approximately 7 mm in width and length, the eight pole piece pairs respectively, in between, will occupy the remaining perimeter. For a given size of plate, the sizes of aperture and pole piece required will determine the number of apertures and pole pieces that can be accommodated in a given circumference. For the examples given, the slots in the plates can vary between 1 and 2 mm in width.

As shown earlier, the magnetic flux density of the magnet can then be chosen for a specific plate dimension. In a specific embodiment, curving the outer portions of facing pole pieces towards each other, so that that facing edges are separated by a distance that is approximately half that of the uncurved plate separation, the flux intensity between the plates can approximately double. Thus, the larger the plate separation the greater the capacity of the collection unit, but facing pole pieces towards one another, maintains nearly the same capacity (as that of the uncurved pole pieces) but with the advantage of the properties of enhanced magnetic flux fields obtainable with closer plate separation. The rod is provided with an axial recess or groove 10 on an outer face. The plates 2, 3 are further provided with a tab 11 on an internal surface which locates into said groove 10, to ensure that the recesses 6 and pole pieces 5, respectively, of adjacent collecting units, are in radial and axial alignment if the collection units are identical, or in an alternative radial alignment if the collection units are not identical. The groove provided on the rod will thus only accept the collection units in their respective chosen orientation of recesses and pole pieces. A spacer 9 is optionally mountable onto the rod so that it separates a further unit, which could be identical to, or have different dimensions to that of the first-mentioned unit, to be mounted on after it. The spacer may be used to modify the magnetic flux pattern as and when desired. For example, the spacer enables separation of the magnetic fluxes in adjacent collection units, which might otherwise be over-saturated due to the combining effect of like poles being positioned directly adjacent each other. It has been found that when like poles are placed adjacent to each other, the combined magnetic flux could, in some circumstances, be greater than the optimum for the available peripheral surface area. The use of a non-magnetisable spacer facilitates prevention of dispersal of magnetic flux from adjacent core units. Magnetisable spacers, on the other hand, can cause dispersion of the magnetic flux, which can be used to advantage should one wish to tailor the degree of saturation in the vicinity of the collection region. Adjacent units are oriented so that like poles on adjacent collecting units are facing. Further collection units are mounted on the rod and separated in a similar manner.

Figure 10:
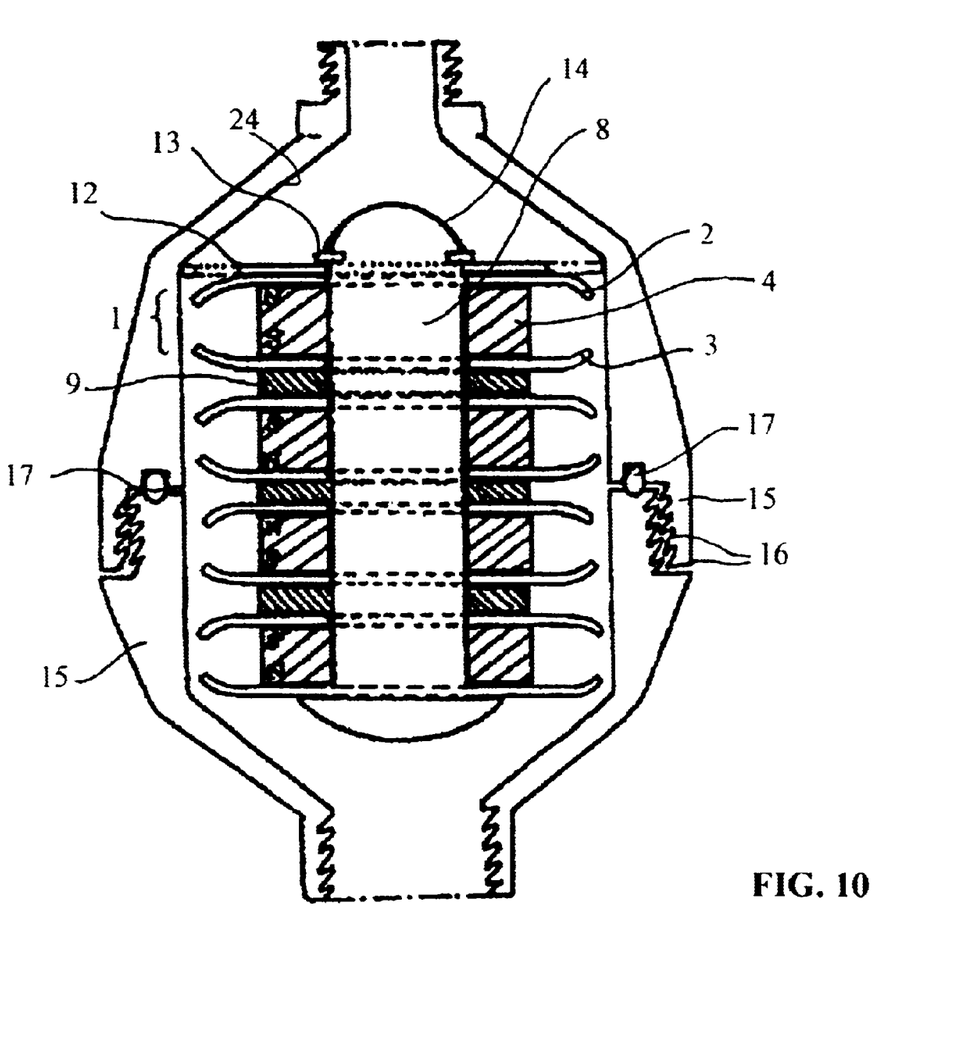
FIG. 10 is a cross-section through a magnetic filtration system.
Figure 13:
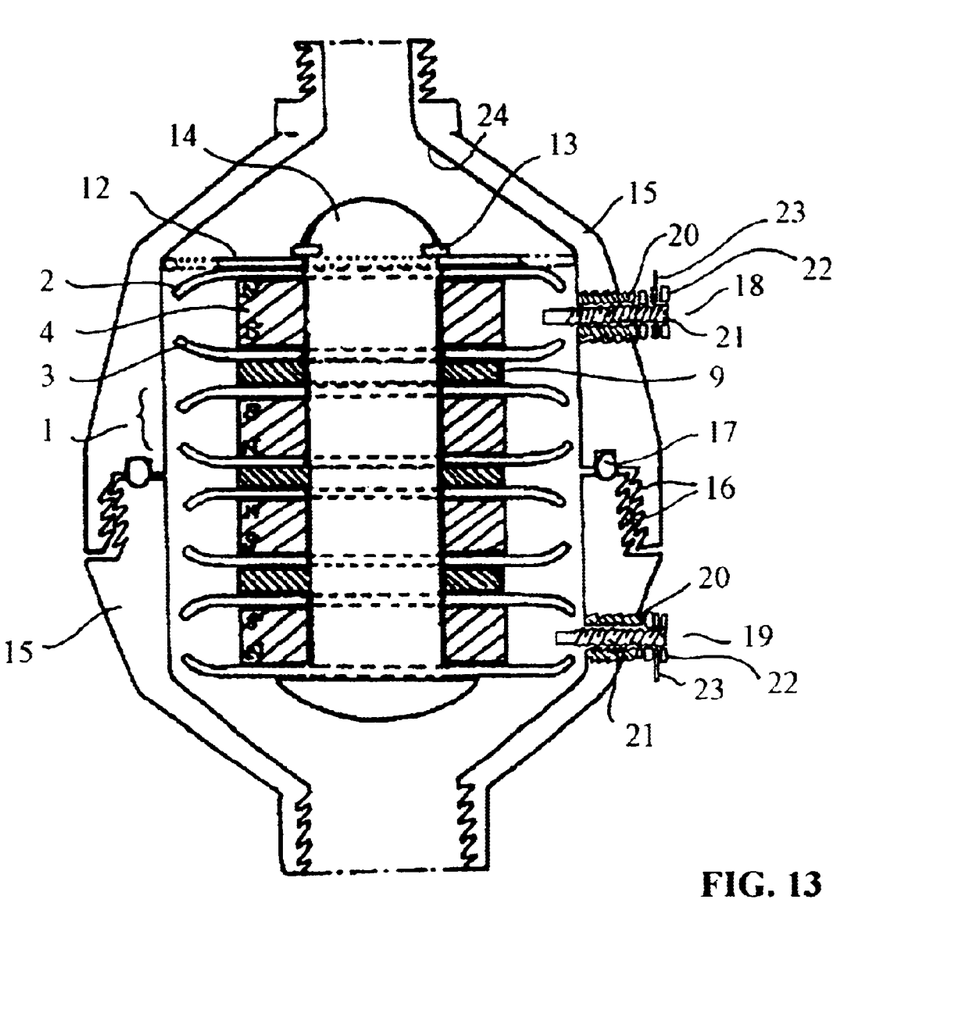
FIG. 13 is a cross-section through a magnetic filtration system with contaminant indicator means.
Figure 17:
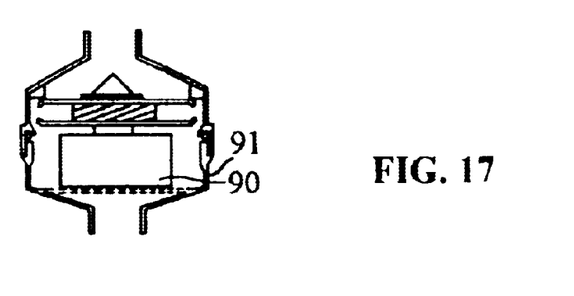
FIG. 17 illustrates a magnetic filtration system having one or a plurality of collection units and a filtration medium for removal of non-magnetisable material.

A distribution plate 12 (shown in FIGS. 10 and 13) preferably made of a non-magnetisable material abuts the first plate in the line of flow. A circlip or other retaining means 13 is disposed on one side of the distribution plate and in abutment with the last mounted collection unit to maintain the collection units in their axial locations. The rod 5 is further provided with flow distribution means 14 that can be domed in shape as shown in FIGS. 10 and 13 or conical in shape as shown in FIG. 17. An internal surface 24 of the housing is conical in shape and flow distribution means 14 is an integral part of the rod 8. Fluid entering through the inlet is thus directed towards the apertures in the most proximal plate.

The rod 8 mounted with collection units 1 is disposed in a housing 15 divided into two parts, which interlock by means of threaded surfaces 16 and which can be sealed by sealing means 17 in the form of, for example, a rubber 'O'-ring. The two parts of the housing may be screwed apart to access the assembly of collection units, as may be the case when the unit is inspected for evidence of mechanical wear and/or if it requires cleaning. They can then be screwed together to re-enclose them, when the filtration system is ready for re-use.

Figures 11, 12:
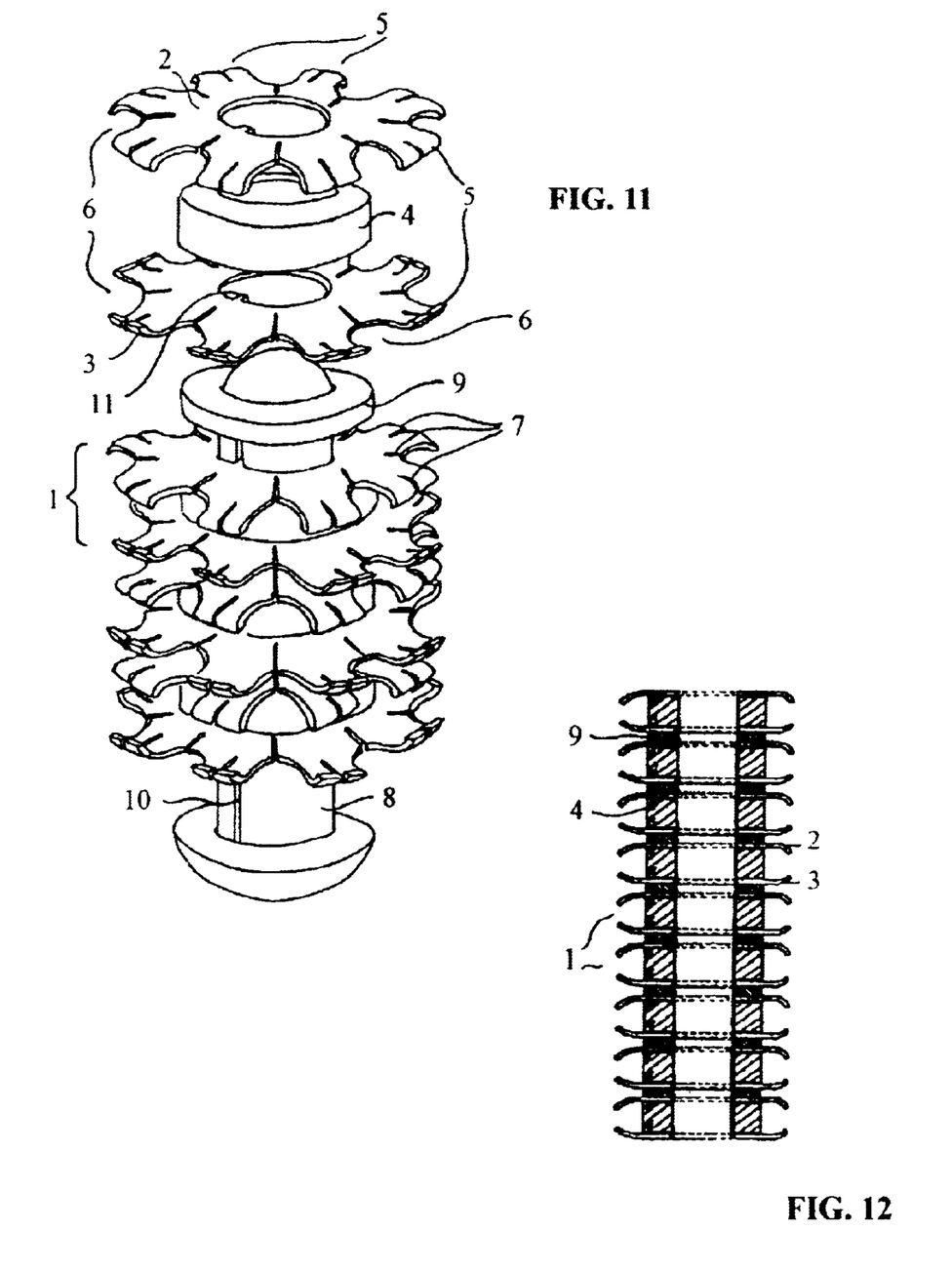
FIG. 11 is an exploded view of a stack of collection units.
FIG. 12 is a cross-section of a plurality of collection units.

Alternatively, the collection unit assembly illustrated in FIGS. 10 and 12 may be disposed in housing means that is integral to the fluid flow system. As there is no obstructive barrier across the entire cross-section of flow, the magnetic filtration assembly has no minimum fluid pressure or flow requirements. Therefore, these factors do not place constraints on the location of the collection units. The housing may be a part of a fluid line, part of the fluid system housing or other part of the fluid system. The housing may be made of a material to enable the filtration system to withstand the fluid pressure of the system of which it will be part. For example, a unit having four collection units housed in a housing, approximately 135 mm long and 90 mm in diameter, made of aluminium can withstand pressures of up to 7000 psi.

Detector means 18, 19 (FIG. 13) can be provided for detecting the presence of magnetisable material collected between said pairs of pole pieces. Said means could be mounted in the housing 15 and connected directly, or accessible remotely, to indicator means on the outside of the housing or to a remotely located indicator unit.

One form of detector means 18, 19 comprises an insulator 20 disposed in an aperture in the housing 15. A probe 21 made of conducting material, is disposed inside the insulator 20 so that one end of the probe protrudes into the collecting region between one of the pairs of pole pieces, and the other end of the probe remains outside the housing. Retaining means 22 retains a conducting connector 23 on the part of the probe 21 outside the housing. It also retains a sealing means 24 against the aperture in the housing and the insulator 20. In this embodiment, the build up of metal particles between the probe and the plate will complete the circuit.

Figure 14:
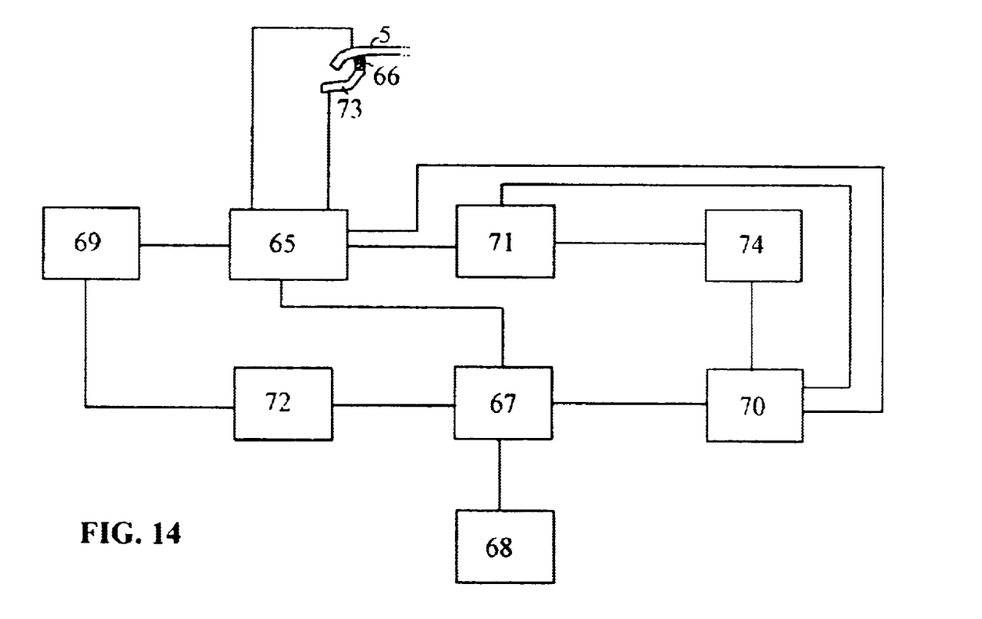
FIG. 14 is a schematic diagram showing circuitry for a detector means for indicating the presence of magnetisable material collected in a collection unit.

Referring to FIG. 14, in another embodiment, a probe 73 is connected to a signal processor 65, which is also connected to a pole piece 5 of one or more collection units via an insulator 66. A switch 67 activates a power supply 68, which provides current to the probe 73 via a further switch 72 and a timer 69. The switch 72 can be automatically activated by the timer 69, which can be controlled by a computer 70. The signal processor 65 is additionally connected to display means 71, the switches 67, 72 and the timer 69. The presence of magnetisable material on the plate will vary the electrical characteristics of the circuit. The electrical characteristics will depend on the type and size of material in the fluid system. In an alternative circuit, the presence of debris collected between the probe and the pole piece 5 has to be greater than a pre-determined value to enable the circuit to be completed. The advantage of the other embodiment over the latter means that debris can be detected in very small amounts. The debris does not have to build up to such an extent that it will complete a circuit. The electrical properties (voltage/current/resistance) of this connection can then be displayed on the display 71 as well as relayed to the computer 70. The system can be calibrated to known contaminant levels to enable reference data to be provided when the system is in use. Data from the signal processor can be output to display means and/or a monitoring computer. Detection may be a continuous process or one which is performed at given intervals. The frequency of the detection process can be increased when debris build up accelerates beyond a pre-determined rate. An alarm 74, which may be audio or visual, can also be activated when debris build-up rises to a pre-determined level or if it rises at a rate greater than a further pre-determined rate. Following receipt of data from the signal processor, the computer 70 may have facility, via the switch 67, for shut-off of the fluid system operation if a pre-determined threshold level of system contamination is reached.

In an arrangement having substantially common collection units, fluid containing metal contaminant will flow into the recesses and metal debris builds up between pairs of pole pieces 5. Detector means 18 disposed by the first collection unit encountered by the flow will then act as an indicator of early build up of debris in the filtration system. Because some of the metal particles suspended in the fluid are removed as fluid first flows through a collection unit, the fluid which flows into the next collection unit therefore contains less metal contaminant. Thus, the collection unit furthest from the inlet will take the longest to fill with debris. Detector means 19 disposed by this collection unit will indicate when the fluid filtration system is substantially filled with contaminant.

The detector means could also be used to indicate the quantity of debris present, and not just its presence. In one example, once the circuit is connected, different amounts of debris will offer respectively different resistances to the passage of current in the circuit. Once calibrated, current or other readings could then relate to the amount of debris collected.

Greater numbers of collection units can be stacked together (FIG. 12) to further enhance the collection capacity of metallic debris, by the filtration system.

In a further embodiment, distribution plates are disposed at the plates nearest the inlet and outlet means, and between adjacent collection units.

In another embodiment, the distribution plate may be omitted depending on the flow rate required through the device and the clearance between the outer diameter of the metal plates and the housing.

Figure 15:
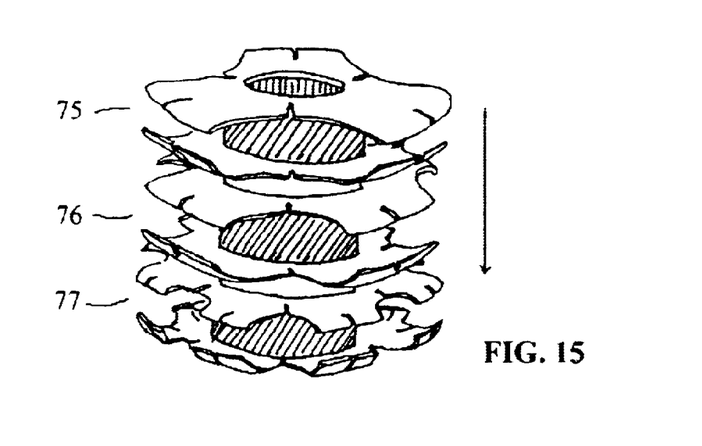
FIG. 15 is a perspective view of an arrangement of collection units of varying dimension.

In a further embodiment shown in FIG. 15, the collection units can be provided with successively larger recesses or apertures to vary the magnetic flux density along the direction of flow. Collection units with smaller recesses or apertures will have greater magnetic flux intensity in both collecting portions and in fluid pathways. The axial distribution of flux intensity will thus produce a gradation in the size and or type of particle that is input to the system and also therefore prevent occlusion of the first-impinged collection unit before subsequent collection units are filled. In FIG. 15, collection unit 75 is disposed closer to inlet means (not shown) to the collection unit assembly than collection unit 77. Unit 75 has larger apertures than collection unit 76, the apertures of which, are larger than those of collection unit 77. Collection unit 77 therefore exerts a greater magnetic flux density than collection unit 75. For example, particles that are more easily magnetised may be captured with comparatively widely spaced plates and/or comparatively larger recesses. Less easily magnetised particles may be captured between more closely packed plates and/or with comparatively smaller recesses. For example, iron-based particles may be captured more easily than say aluminium and phosphor bronze. Indeed, it is quite possible to capture particles having a very low magnetic permeability, so long as the spacing and recesses are defined accordingly.

Collection units can be removed from the fluid system for inspection of material collected therein, for example, for component condition monitoring, and/or cleaning of any material collected. At its places of insertion into a fluid system, the filtration system can be disconnected at both or either its outlet and/or inlet using isolation means (not shown) to maintain fluid in the fluid system (if so desired) whilst the filtration system is disconnected from it. To remove material from the units shown in FIGS. 10 and 13, the housing 15 is screwed apart and the collection unit assembly is removed. The circlip is removed to allow the collection units to be removed from the rod 8. The plates, held on by magnetic attraction to the magnet, are pulled off the plates. Once removed from the plates, material attached to the plates is no longer magnetised and these can be wiped off. Material attached to the magnet can also be wiped off.

Alternatively, the collection unit assembly need not be dismantled where an air line is used to blow off any debris collected. The cleaned core unit can then be fitted into the two parts of the housing, sealed inside and re-fitted to the fluid system.

In an embodiment where the housing is integral to that of the fluid system, the collection unit assembly is removed and re-inserted by means available to that particular housing.

Figure 16:
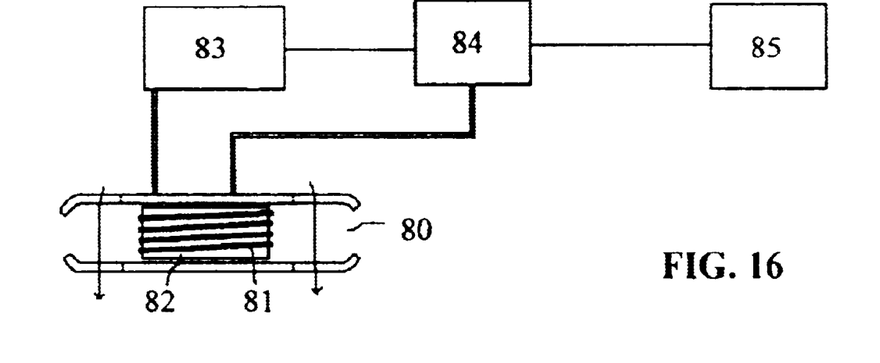
FIG. 16 illustrates a collection unit having an electromagnet.

In FIG. 16, an electromagnet 80 is in the form of a coil of wire 81 wrapped around a core 82 made of soft iron or other magnetisable material. As is known to those skilled in the art, when current is passed through the coil, a magnetic field is induced in its vicinity, one end of the coil magnetised North, the other, South. Depending on the degree of magnetisation required, the plates 2, 3 can be disposed against or in close proximity to the electromagnet to gain the magnetic polarity of the respective side of the coil. Alternatively, the magnitude of the current to the coil, the type of material in the coil and the number of turns in the coil can be varied to the produce the desired magnetisation required for respective plate designs.

To operate a filtration system incorporating an electromagnet, current is passed to the coil to place the system in a filtration mode of operation. This current can then be switched off when the system is in cleaning mode. At the points of its insertion in a fluid system, the filtration system could then be disconnected at both or either its outlet and/or inlet using isolation means (not shown) as described earlier. When the current is switched off and the electromagnet de-activated, the no flux extends through the plates or to the particles collected there. As these particles are no longer held on the plates and electromagnet(s) by magnetism, they are much easier to remove than when the electromagnet is activated. The particles can be removed by flushing a fluid through the assembly. These can be collected for more detailed analysis of component condition.

The filtration system may be provided with a housing that facilitates the loading of a further clean collection unit assembly as soon as a contaminated one is removed. This advantageously reduces fluid system down-time when the filtration system is removed. The assembly replacement could be automated if the unit is mounted on a motorised or hydraulically operated housing. If detection means, for determining the quantity of material collected, is used in conjunction with such an assembly, replacement of the collection unit assembly could be triggered at regular intervals or if a pre-determined level of material is attained. As mentioned before, where close down or shut-off means is provided in the fluid system, this can be activated if contamination levels rise beyond pre-determined acceptable values.

Figure 18A:
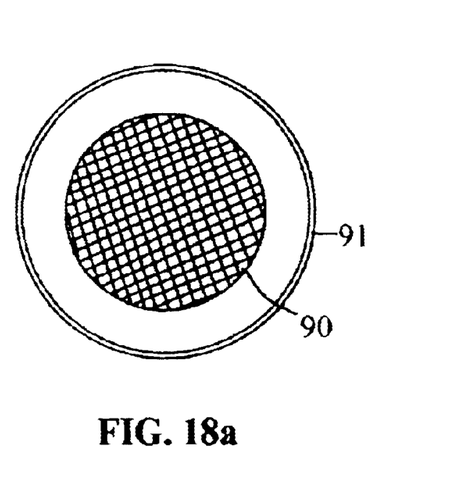
FIGS. 18a and 18b are cross-sections of conventional filter media included in FIG. 17.
Figure 18B:
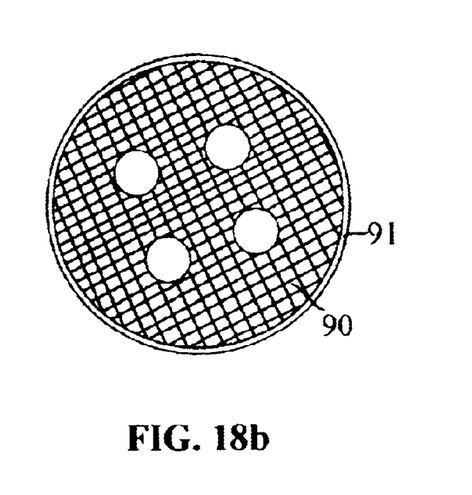

In a still further embodiment shown in FIG. 17, conventional filter medium 90 made of cellulose fibre, metal or other material could be included in the magnetic filtration system to remove non-magnetisable material input to the system. When the filter medium is placed downstream of one or more collection units, the capacity of the medium is taken up by only non-magnetisable material, as the collection units remove the magnetisable particles from the fluid before it reaches the filter medium. In the examples shown in FIGS. 18a and 18b, the medium 90 presents a smaller cross-sectional area to the flow than that of the overall cross-section of its enclosing means 91 so that, even at capacity, fluid is still able to flow past or through the conventional filter medium 90.

What is claimed is:

1. A magnetic filtration system for filtering magnetisable material from a fluid in which said magnetisable material is in suspension comprising:

inlet means;

outlet means;

a plurality of collection units disposed between the inlet means and the outlet means;

each collection unit comprising a magnet and at least two plates or plate arrays disposed on other side of the magnet so that the plates or plate arrays have opposing polarities, wherein portions of the plates or plate arrays extend beyond part or all of an edge or edges of said magnet, facing plates of each of said collection units have one or a plurality of apertures and facing pole pieces between said apertures create magnetic flux fields which define one or more collection regions of magnetic attraction and magnetisable material collection, to facilitate collection of said magnetisable material in the collection regions between exposed facing plate portions, wherein facing collection regions in each said collection unit are disposed between facing aperture such that said magnetic flux fields generated in the collection regions facilitate collection of said magnetisable material in a volume sandwiched between exposed facing plate portions, and wherein the respective plates of adjacent collection units having like polarity are disposed adjacent to one another so as to substantially restrict the collection of said magnetisable material to the collection regions.

2. A magnetic filtration system as in claim 1 further comprising a housing made of non-magnetisable material.

3. A magnetic filtration system as claimed in claim 1, further comprising a housing having means for connection to a flow system, the collection units being located in the housing.

4. A magnetic filtration system as claimed in claim 1, wherein each collection unit is further separated from an adjacent collection unit by a spacing member.

5. A magnetic filtration system as claimed in claim 4, wherein said spacing member is non-magnetic.

6. A magnetic filtration system as claimed in claim 4, wherein said spacing member is magnetic.

7. A magnetic filtration system as claimed in claim 1, wherein the apertures in respective collection units, which are in closer proximity to the inlet means, are larger than those of units disposed nearer the outlet means.

8. A magnetic filtration system as claimed in claim 1, further comprising alignment means for disposing the apertures and pole pieces, in the facing plates of a collection unit, in substantial axial alignment.

9. A magnetic filtration system as claimed in claim 8, further comprising further alignment means for disposing the apertures of respective collection units in substantial axial alignment.

10. A magnetic filtration system as claimed in claim 9, wherein said alignment means and further alignment means comprise a tab of given dimension on an internal edge of the plate and an axial unit having a groove of corresponding dimension to that of the tab, into which groove said tab can locate to provide a chosen axial and radial alignment of the facing plate portions and apertures of one or more of said collection units.

11. A magnetic filtration system as claimed in claim 1, further comprising flow directing means for directing fluid flow from the inlet means towards the apertures in said plates.

12. A magnetic filtration system claimed in claim 1, further comprising slot-like apertures in said apertures and facing plate portions to further enhance the magnetic flux density between the facing plates of the collection units.

13. A magnetic filtration system as claimed in claim 1, wherein the facing pole pieces are curved towards one another to further enhance the magnetic flux fields therebetween.

14. A magnetic filtration system as claimed in claim 1, wherein the facing plates or plate arrays are separated by a distance which best utilises the magnetic flux emergent from edges of said facing plates or plate arrays to attract and retain said magnetisable material in the fluid and which also facilitates a required collection capacity.

15. A magnetic filtration system as claimed in claim 1, wherein the attractive flux lines between facing pole pieces are substantially orthogonal to repulsive flux lines in the apertures, such that the magnetisable material entering the apertures, is subject to the influence of both attractive and repulsive flux fields.

16. A magnetic filtration system as claimed in claim 1, further comprising a housing and wherein internal surfaces of the housing are disposing in close proximity to the outer portions of said facing plates or plate arrays in order to substantially constrain fluid flow in the filtration system to regions in which magnetic flux fields generated by said facing plates or plate arrays facilitate the attraction and retention of the size range and type or types of the magnetisable material input to the filtration system.

17. A magnetic filtration system as claimed in claim 1, further comprising one or a plurality of distribution plates having further apertures in substantial axial alignment with said plate apertures, with each of the one or plurality of distribution plates being disposed on either side of one or more of the collection units to ensure that all fluid is exposed to regions having magnetic flux density similar to, or greater than, a threshold required for particle attraction.

18. A magnetic filtration system as claimed in claim 2, wherein the housing comprises one or a plurality of sealable sections with interlockable threaded portions that enable said sections to readily assembled or dismantled.

19. A magnetic filtration system as claimed in claim 2 wherein the housing includes means for attachment to a fluid system.

20. A magnetic filtration system as claimed in claim 1, further comprising isolation means for isolating fluid flow to and from the filtration system to facilitate removal of fluid flow from and insertion into the filtration system.

21. A magnetic filtration system as claimed in claim 1, further comprising monitoring means, for monitoring the presence and/or amount of said magnetisable material collected, in the filtration system.

22. A magnetic filtration system as claimed in claim 21, further comprising system close down means which is actuated upon detection of a pre-determined level of material collected in the filtration system.

23. A magnetic filtration system as claimed in claim 1 further comprising a filter medium disposed in the housing to remove non-magnetisable particles input to the system.

24. A magnetic filtration system as claimed in claim 1, wherein at least one of said collection units includes an electromagnet and switch means for activating the electromagnet to collect said magnetisable material and for de-activating the electromagnet to facilitate release of said magnetisable material collected.

25. A magnetic filtration system as claimed in claim 1, further comprising cellulose fiber, metal or other filter material to remove non-magnetisable material input to said system.

26. A magnetic filtration system as claimed in claim 25, wherein said filter material is placed downstream of one or a plurality of said collection units.

27. A method for removing magnetisable material from a fluid in which said magnetisable material is in suspension, comprising:

providing an apparatus as claimed in claim 1, passing the fluid through said apertures, and attracting and retaining said magnetisable material in said collection regions.

28. A method as claimed in 27, further comprising detaching the plates from the magnet and mechanical removal of said magnetisable material from the plates and the magnet or magnets.

29. A method as claimed in claim 27, further comprising removing said magnetisable material collected, in an undismantled collection unit, with an air line.

30. A method for removing magnetisable material from a fluid in which said magnetisable material is in suspension, comprising:

providing an apparatus as claimed in claim 1 wherein at least one of said collection units includes an electromagnet and switch means for activating the electromagnet to collect said magnetisable material and for de-activating the electromagnet to facilitate release of said magnetisable material collected, passing the fluid, via a fluid system, through said apertures and attracting and returning said magnetisable material in said collection regions, activating the electromagnet to retain said magnetisable material in said regions of magnetic attraction, de-activating the electromagnet to release said magnetisable material from said regions of magnetic attraction, and disposing of said magnetisable material from said fluid system.

31. A method as claimed in claim 30, wherein the activating and de-activating the electromagnet includes passing through coils of the electromagnet.

32. A method for monitoring the quality and/or type of magnetisable material collected comprising:

providing an apparatus as claimed in claim 1, providing detection means for detecting the presence of magnetisable material collected between facing portions of the plates or plate arrays, part of which detection means extends in the collection region of said one or more collection units, monitoring the type or quantity of said magnetisable material present, providing alarm means, setting off the alarm if the quantity of said magnetisable material rises beyond a pre-determined rate or amount, and providing closing down means for a fluid system supplying fluid to said apparatus, and closing down said fluid system if the quantity of said magnestisable material rises beyond a further pre-determined rate or amount.

33. A magnetic filtration system as claimed in claim 1, wherein said facing apertures in said plates define a region of magnetic repulsion.

34. A magnetic filtration system as claimed in claim 33, wherein said facing plates comprises a plurality of said facing apertures defining a plurality of regions of magnetic repulsion.

35. A method as claimed in claim 27, wherein said facing apertures in said plates define a region of magnetic repulsion.

36. A method as claimed in claim 35, wherein said facing plates define a plurality of regions of magnetic repulsion from which magnetisable material is repelled.

* * * * *